US010156273B1

(12) United States Patent
Huang

(10) Patent No.: US 10,156,273 B1
(45) Date of Patent: Dec. 18, 2018

(54) VEHICLE PISTON PUSHER

(71) Applicant: POUL CHANG METAL INDUSTRY CO., LTD., Taichung (TW)

(72) Inventor: Chia-Hao Huang, Taichung (TW)

(73) Assignee: POUL CHANG METAL INDUSTRY CO., LTD., Taichung (TW)

( * ) Notice: Subject to any disclaimer, the term of this patent is extended or adjusted under 35 U.S.C. 154(b) by 0 days.

(21) Appl. No.: 15/834,928

(22) Filed: Dec. 7, 2017

(51) Int. Cl.
*B23P 19/04* (2006.01)
*F16D 65/00* (2006.01)
*F16D 55/00* (2006.01)

(52) U.S. Cl.
CPC .......... *F16D 65/0043* (2013.01); *F16D 55/00* (2013.01)

(58) Field of Classification Search
CPC .. B23Q 3/00; B23Q 3/06; B23Q 3/154; B23P 11/00; B23P 11/005
See application file for complete search history.

(56) References Cited

U.S. PATENT DOCUMENTS

| 6,574,846 | B1* | 6/2003 | Kang ................. | B25B 27/0021 |
| | | | | 29/239 |
| 8,656,569 | B2* | 2/2014 | Klann ................ | B25B 27/0064 |
| | | | | 29/255 |
| 8,826,504 | B1* | 9/2014 | Slivon ................ | B25B 27/0035 |
| | | | | 29/239 |
| 2012/0204393 | A1* | 8/2012 | Gentner ............. | B25B 27/0035 |
| | | | | 29/257 |

* cited by examiner

*Primary Examiner* — Lee D Wilson
(74) *Attorney, Agent, or Firm* — WPAT, PC

(57) ABSTRACT

A vehicle piston pusher, pushing at least a piston back into a piston bore of a brake caliper, includes a base, a rotation member, a movable plate, and a direction switchable ratchet wrench. The rotation member is rotatably disposed on the base and includes an inner barrel and an outer barrel coupled together. The movable plate has an outer surface and an opposite inner surface. The outer surface contacts at least a piston. The inner surface has a thread rod which is screwedly combined with the inner barrel along an axial direction of the rotation member. The direction switchable ratchet wrench is connected with the rotation member for driving the rotation member, such that the movable plate moves toward or away from the movable plate. When the movable plate moves away from the base, the at least a piston is pushed back into the piston bore.

9 Claims, 6 Drawing Sheets

VEHICLE PISTON PUSHER

BACKGROUND OF THE INVENTION

1. Field of the Invention

The present invention relates to vehicle maintenance devices, and more particularly, to a vehicle piston pusher for pushing back the piston of the brake caliper of the vehicle, so as to install a new brake lining.

2. Description of the Related Art

When replacing the brake linings of a vehicle, a specific tool is needed to push the piston of the brake caliper back or into the piston bore, such that the brake caliper is provided with sufficient space for facilitating the installation of new brake linings.

However, for a conventional brake caliper, the space for linings installation is relatively limited. Without the assistance of the specific tool, the user is almost unable to install the brake linings with bare hands. Also, conducting the installation process with bare hands may risk the safety of the user. Even though certain vehicle maintenance practitioners manage to push back the piston with a hydraulic device, the strength output by the hydraulic device might be overpowered, such that the piston risks is potentially damaged and oil leakage may possibly occur.

Therefore, it is desirable for the industry to improve the conventional tools for facilitating linings installation.

SUMMARY OF THE INVENTION

For improving the issues above, a vehicle piston pusher is disclosed. With a rotation member disposed at the seat thereof, the rotation member is driven by a direction switchable ratchet wrench. The thread rod disposed at the rotation member triggers the movable plate to move toward or away from the base, so as to adjust the distance between the base and the movable plate, thereby pushing the piston back into the piston bore. The present invention achieves a structural simplicity and the convenience of operation.

For achieving the aforementioned objective, a vehicle piston pusher in accordance with an embodiment of the present invention is provided for pushing at least a piston back into a piston bore of a brake caliper, the vehicle piston pusher comprising:

a base;

a rotation member disposed at the base, the rotation member including an inner barrel and an outer barrel coupled with the inner barrel;

a movable plate provided with an outer surface and an inner surface in opposite to the outer surface, the outer surface resisting against at least a piston, the inner surface provided with a thread rod, the thread rod being screwed to the inner barrel along an axis of the rotation member; and a direction switchable ratchet wrench connected with the rotation member and rotationally driving the rotation member, such that the movable plate moves toward or away from the base, whereby when the movable plate moves away from the base, the at least a piston is pushed back to the piston bore.

With such configuration, the present invention applies the cooperation between the rotation member and the thread rod to adjust the distance between the movable plate and the base, so as to achieve an efficient operation and a structural simplicity.

DETAILED DESCRIPTION OF THE INVENTION

Figure 1:
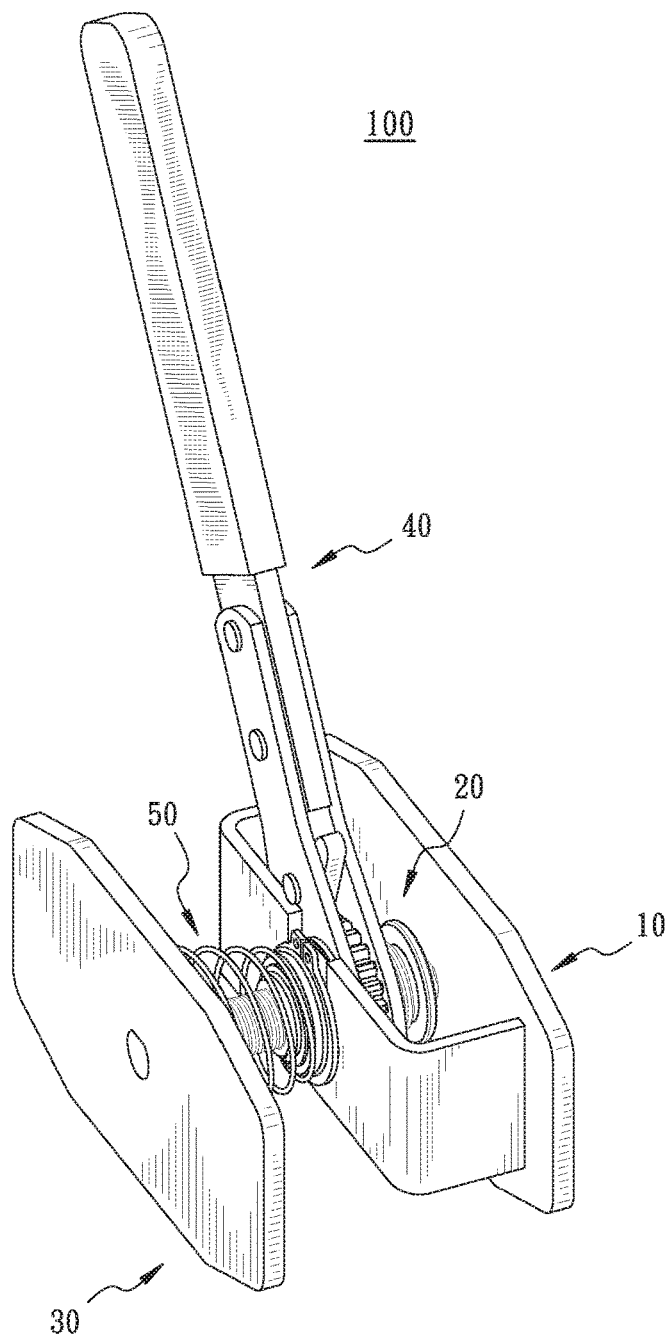
FIG. 1 is a perspective view of the vehicle piston pusher in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion. Substitutions and modifications of elements with identical and analogical functions are included in the claim scope of the present invention.

Referring to FIG. 1 to FIG. 6, the vehicle piston pusher 100 in accordance with an embodiment of the present invention comprises a base 10, a rotation member 20, a movable plate 30, a direction switchable ratchet wrench 40, and a resilient device 50.

When replacing new brake linings, the user operates the direction switchable ratchet wrench 40 to drive the movable plate 30 to move toward or away from the base 10. When the movable plate 30 moves away from the base 10, at least a piston is pushed back into a piston bore of a brake caliper, or two pistons are pushed back into a corresponding piston bore, respectively.

The base 10 has an outer lateral side 11 disposed at one side thereof. A support case 12 is disposed at the rear surface of the outer lateral side 11, wherein the support case 12 has a sectional face generally formed in a U shape and provided with a positioning groove 13, such that the rotation member 20 is rotatably disposed in the positioning groove 13.

Figure 2:
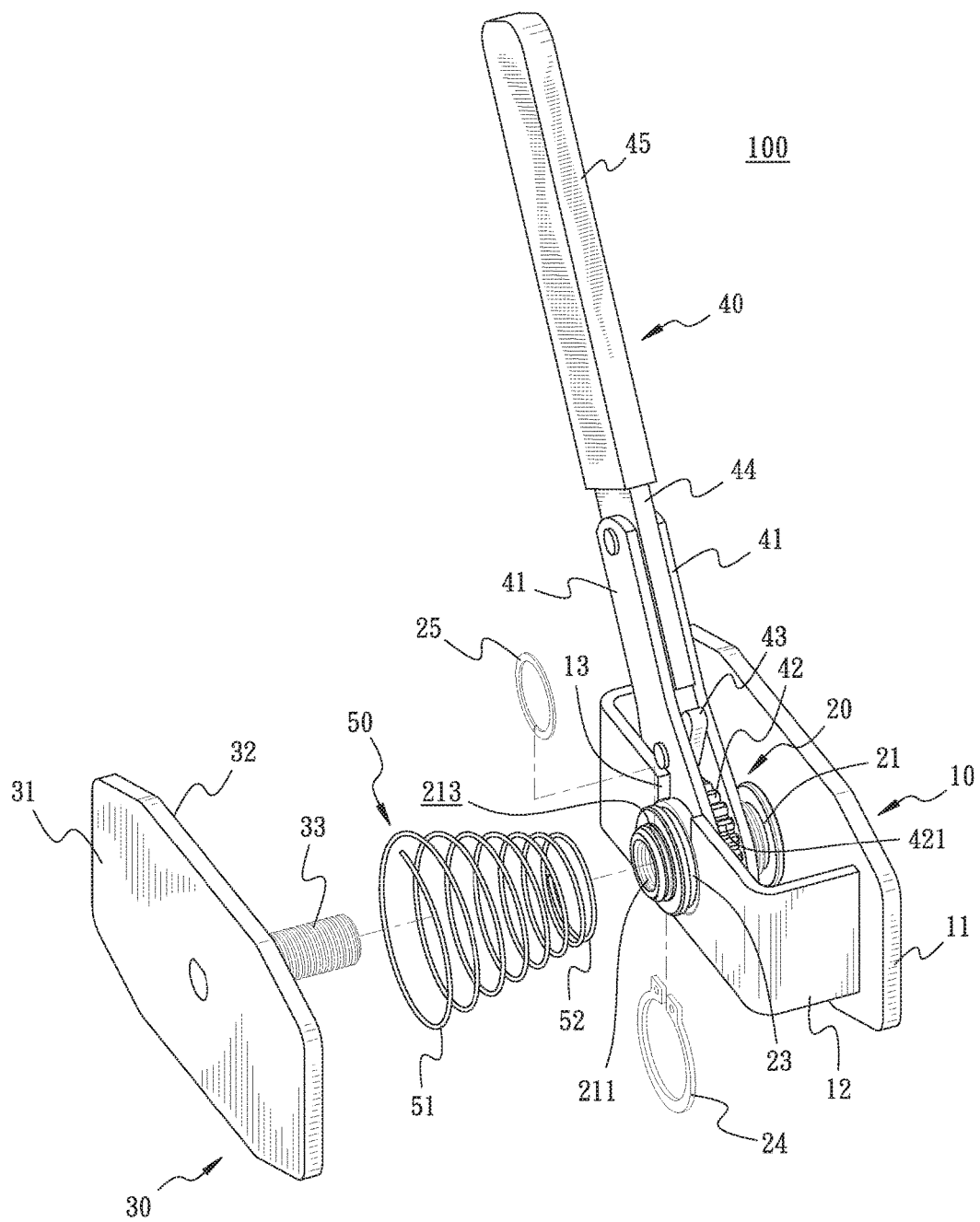
FIG. 2 is an exploded view of the vehicle piston pusher in accordance with an embodiment of the present invention.
Figure 3:
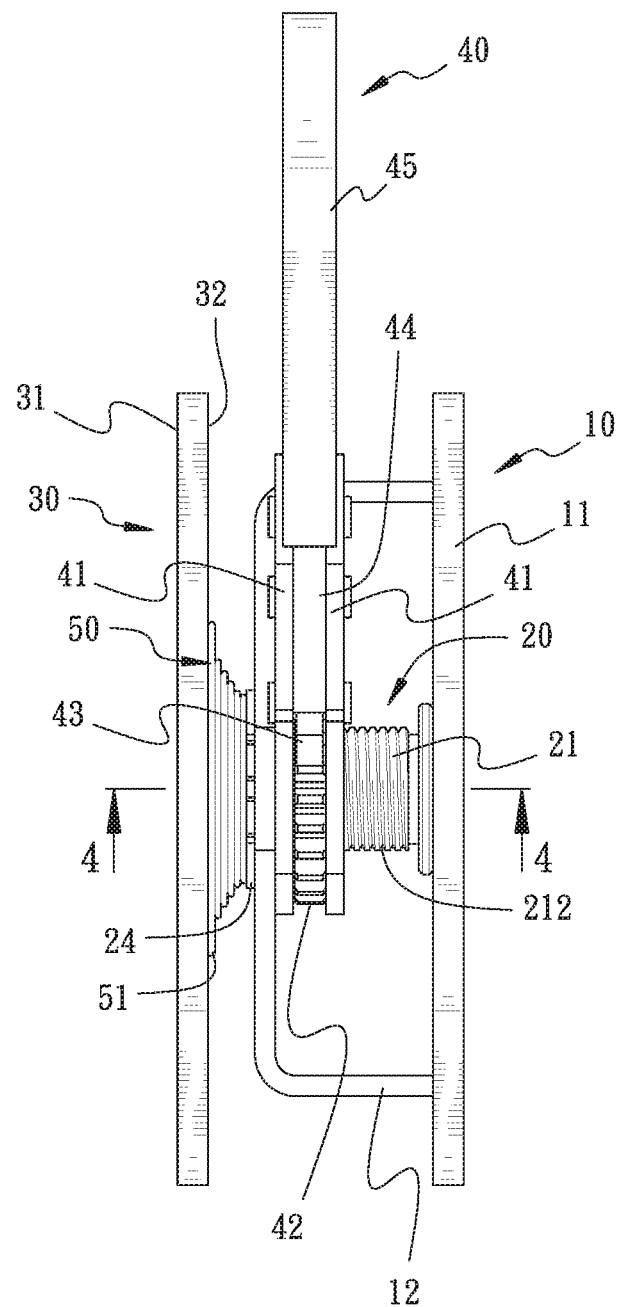
FIG. 3 is a schematic side view of the vehicle piston pusher, illustrating the status of the movable plate arranged in adjacent to the base.
Figure 4:
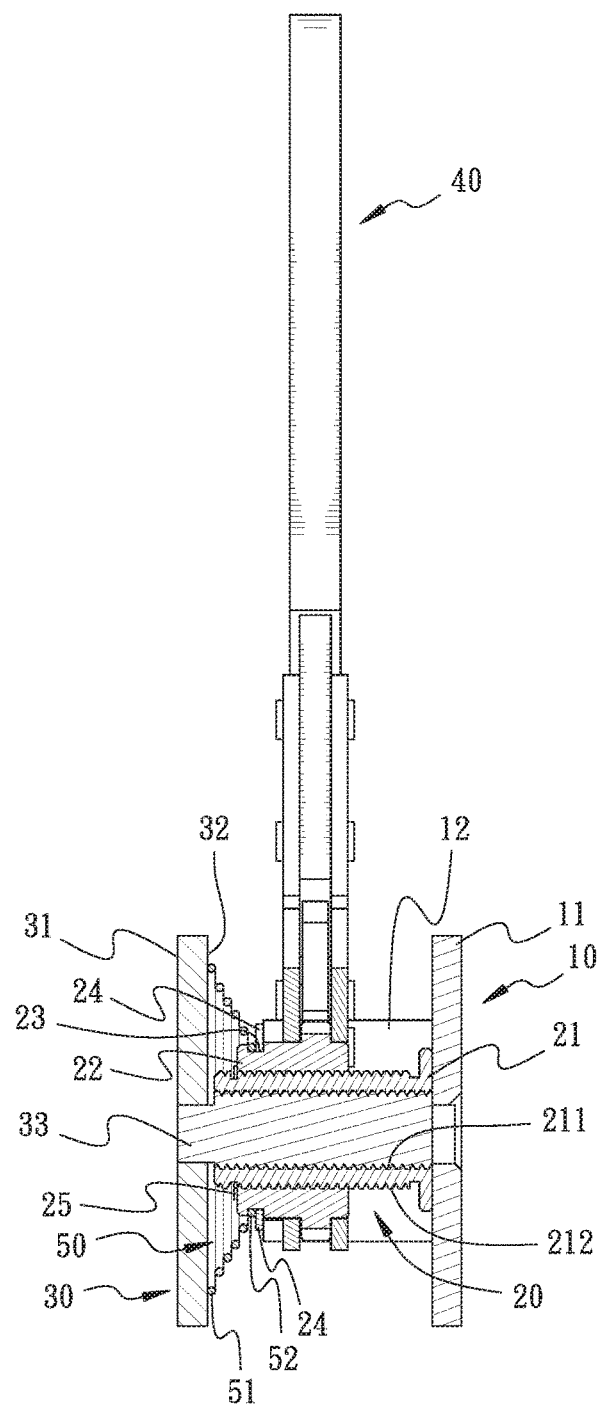
FIG. 4 is a cross-sectional view taken along line 4-4 in FIG. 3.

Referring to FIG. 2 to FIG. 4, the rotation member 20 includes an inner barrel 21 and an outer barrel 22 coupled with the inner barrel 21. The length of the inner barrel 21 is larger than the length of the outer barrel 22. The inner barrel 21 has a thread bore 211 disposed in axial alignment with the inner barrel 21, with an outer thread section 212 disposed at the outer periphery of the inner barrel 21 and arranged in axial alignment with the inner barrel 21. The outer thread section 212 is screwedly combined with the outer barrel 22. Also, the outer barrel 22 comprises a ring groove 23 in where a first C clamp 24 is embedded for limiting the positioning of the rotation member 20. Further, an end of the inner barrel 21 is provided with a recess ring 213 in where a second C clamp 25 is disposed, so as to prevent the inner barrel 21 from going back inside the outer barrel 22, also to prevent the inner barrel 21 and the outer barrel 22 from being jammed with each other.

The movable plate 30 includes an outer surface 31 and an inner surface 32. The inner surface 32 includes a vertically disposed thread rod 33, which is screwed in the thread bore 211 of the inner barrel 21 along the axial direction of the rotation member 20. The outer lateral side 11 of the base 10 faces away from the inner surface 32 of the movable plate 30 and disposed in parallel to the inner surface 32.

The direction switchable ratchet wrench 40 is connected with the rotation member 20 for driving the rotation member 20 to rotate, so as to trigger the movable plate 30 to move toward or away from the base 10. In an embodiment of the present invention, the direction switchable ratchet wrench 40 includes two stick bodies 41 that are mutually spaced and pivotally disposed at the rotation member 20. The direction switchable ratchet wrench 40 includes a ratchet 42 disposed between the two stick bodies 41. The ratchet 42 includes an outer periphery and ratchet bore, wherein the outer periphery is peripherally provided with a plurality of teeth 421, and the ratchet bore is fixed with an outer face of the outer barrel 22 of the rotation member 20.

Also, the direction switchable ratchet wrench 40 includes a pawl 43 pivotally disposed between the two stick bodies 41 for engaging the teeth 421 of the ratchet 42. Two ends of the pawl 43 are allowed to be optionally exposed at the two stick bodies 41 for being poked by the user, so as to optionally engage the ratchet 42, thereby driving the direction switchable ratchet wrench 40 to trigger the rotation member 20 to rotate clockwise or counterclockwise. An operation shaft 44 is fixed between the two stick bodies 41 and extends away from the ratchet 42, with the distal end of the operation shaft 44 provided with a handle 45 where the user holds to operate.

The resilient device 50 is a compressible spring, which is disposed between the base 10 and the movable plate 30. The resiliency direction of the resilient device 50 is identical to the axial direction of the rotation member 20. The resilient device 50 includes a first end 51 and a second end 52, wherein the outer diameter of the first end 51 is larger than the outer diameter of the second end 52. The first end 51 contacts the inner surface 32 of the movable plate 30. The second end 52 contacts the rotation member 20. In an embodiment of the present invention, the second end 52 of the resilient device 50 and the first C clamp 24 are engaged in the ring groove 23. The diameter of the second C clamp 25 is small than the diameter of the first C clamp 24 and the diameter of the second end 52 of the resilient device 50.

Figure 5:
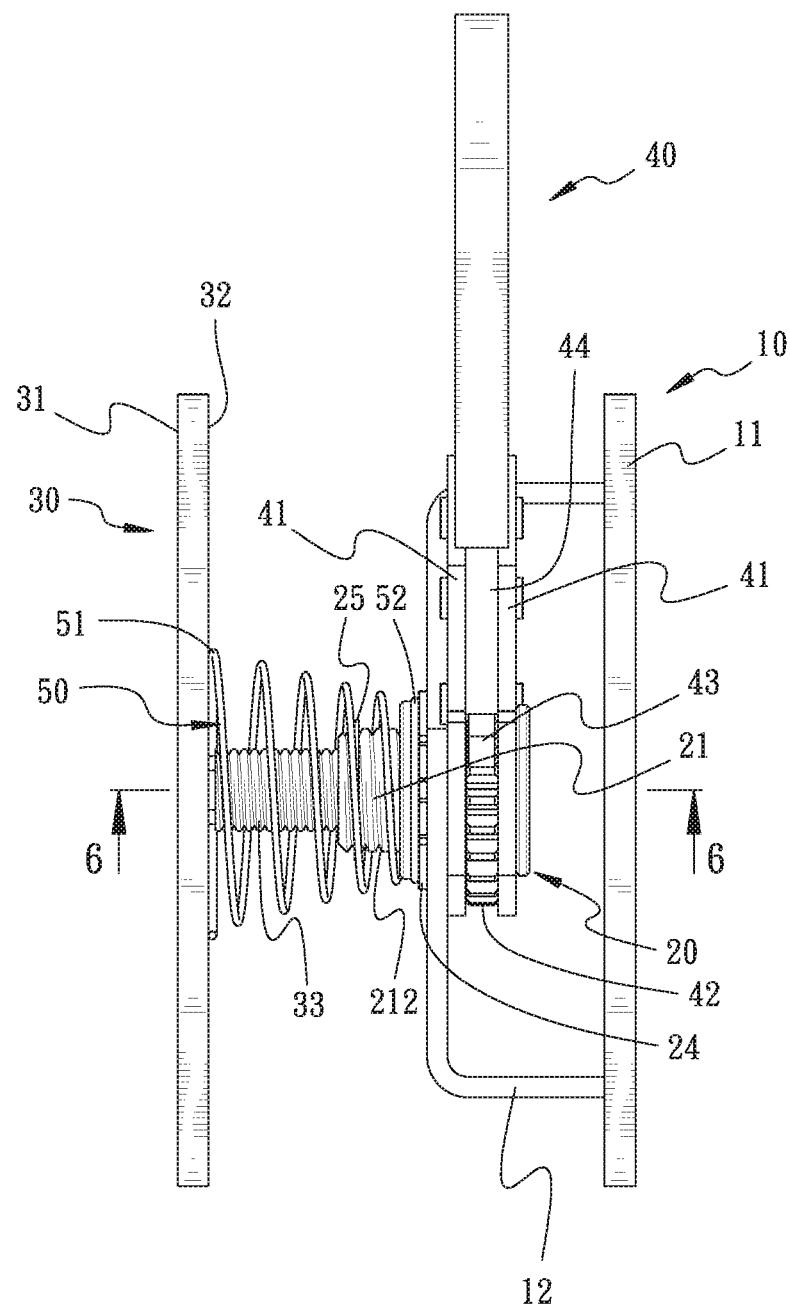
FIG. 5 is another schematic side view of the vehicle piston pusher, illustrating the status of the movable plate arranged away from the base.
Figure 6:
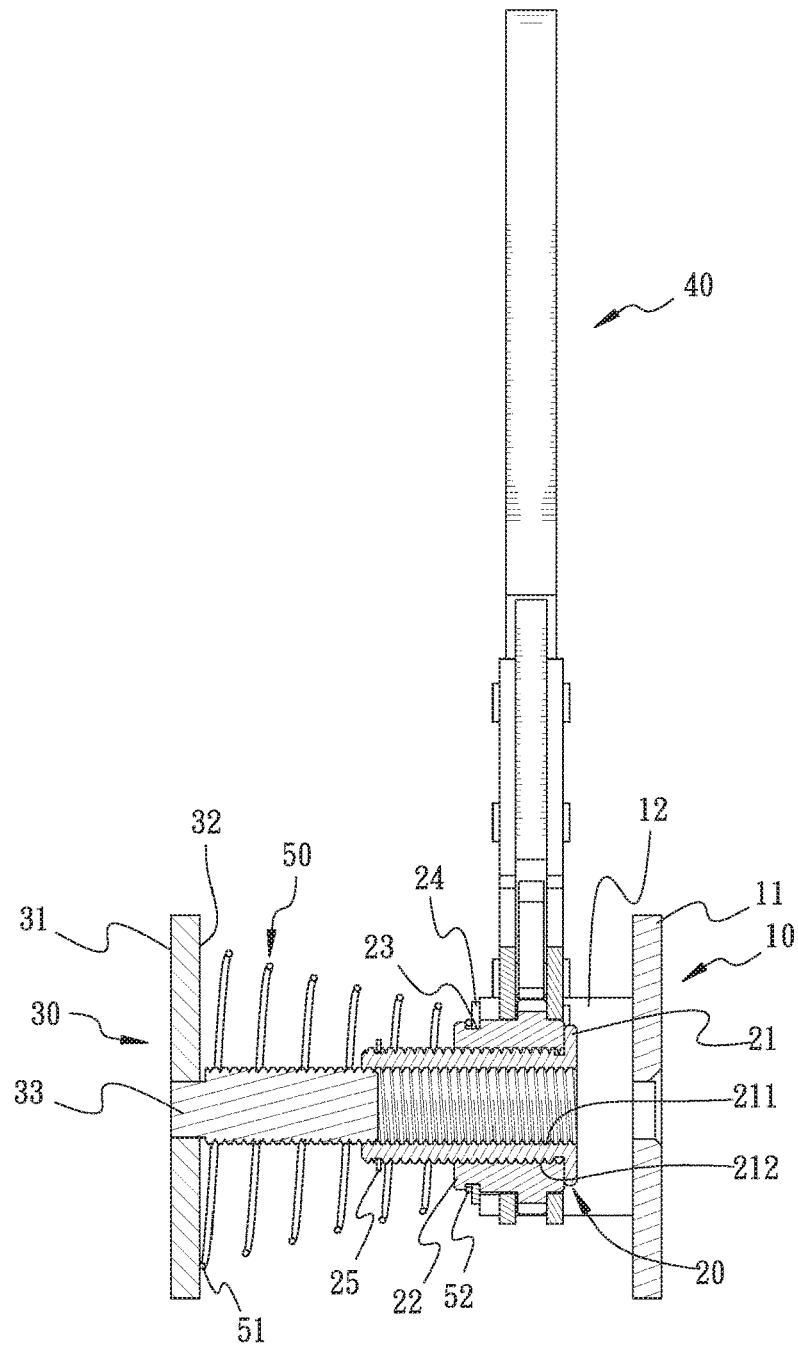
FIG. 6 is a cross-sectional view taken along line 6-6 in FIG. 5.

Referring to FIG. 5 and FIG. 6, when the piston is to be pushed back, the user drives the direction switchable ratchet wrench 40, such that the ratchet 42 of the direction switchable ratchet wrench 40 triggers the rotation member 20 to rotate simultaneously. Also, due to the screwedly combination between the inner barrel 21 and the outer barrel 22 of the rotation member 20, when the inner barrel 21 moves by a certain distance toward the left direction in accordance with the drawing, the thread rod 33 of the movable plate 30 axially moves against the inner barrel 21, whereby the movable plate 30 moves away from the base 10 toward the left direction in accordance with the drawing, so as to push the piston back into the piston bore. Also, when the present invention is to be stored, the direction switchable ratchet wrench 40 is reversely driven, whereby the movable plate 30 moves toward the base 10. Therefore, the present invention allows the user to operate the direction switchable ratchet wrench 40 clockwise or counterclockwise, such that the movable plate 30 moves toward or away from the base 10, so as to carry out the piston pushing operation.

With such configuration, the present invention is applicable to the brake linings replacement operation of both singular piston brake caliper and double pistons brake caliper. For the singular piston brake caliper, by resisting the outer surface 31 of the movable plate 30 on the piston and driving the direction switchable ratchet wrench 40, the movable plate 30 moves away from the base 10 to expand the distance between the movable plate 30 and the base 10, such that the movable plate 30 pushes the piston back into the piston bore for facilitating the lining replacement operation. As for the double pistons brake caliper, with the outer surface 31 of the movable plate 30 resisting upon one of the pistons, and the outer lateral side 11 of the base 10 resisting upon the other piston, the direction switchable ratchet wrench 40 is driven to move the movable plate 30 away from the base 10 to expand the distance between the movable plate 30 and the base 10, so as to push the two pistons back into the corresponding piston bores for facilitating the brake linings replacement operation.

To sum up, the present invention applies the screwing mechanism between the rotation member 20 and the thread rod 33 to adjust the distance between the movable plate 30 and the base 10, achieving a convenience of usage and structural simplicity. Also, the issue of damage caused by conventional hydraulic piston pusher is avoided.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle piston pusher for pushing at least a piston back into a piston bore of a brake caliper, the vehicle piston pusher comprising:
   a base;
   a rotation member disposed at the base, the rotation member including an inner barrel and an outer barrel coupled with the inner barrel;
   a movable plate provided with an outer surface and an inner surface in opposite to the outer surface, the outer surface resisting against at least a piston, the inner surface provided with a thread rod, the thread rod being screwed to the inner barrel along an axial direction of the rotation member;
   a direction switchable ratchet wrench connected with the rotation member and rotationally driving the rotation member, such that the movable plate moves toward or away from the base; when the movable plate moves away from the base, the at least a piston is pushed back to the piston bore; and
   a resilient device disposed between the base and the movable plate, a resiliency direction of the resilient device being identical to an axial direction of the rotation member.

2. The vehicle piston pusher of claim 1, wherein the inner barrel includes a thread bore screwedly combined with the thread rod, the inner barrel including an outer thread section screwedly combined with the outer barrel.

3. The vehicle piston pusher of claim 1, wherein the thread rod is disposed in vertical to the inner surface; the base includes an outer lateral side; the outer lateral side faces away from the inner surface of the movable plate and is disposed in parallel to the inner surface for contacting another piston.

4. The vehicle piston pusher of claim 1, wherein the resilient device is a compressible spring having a first end and a second end, the first end contacting the inner surface of the movable plate, the second end contacting the rotation member.

5. The vehicle piston pusher of claim 4, wherein the base further includes a support case, the support case provided with a positioning groove, the positioning groove receiving the rotation member; the outer barrel of the rotation member includes a ring groove, such that a first C clamp and the second end of the resilient device are disposed in the ring groove.

6. The vehicle piston pusher of claim 4, wherein an outer diameter of the first end of the resilient device is larger than an outer diameter of the second end of the resilient device.

7. The vehicle piston pusher of claim 5, wherein one end of the inner barrel is provided with a recess ring for receiving a second C clamp; an outer diameter of the second C clamp is smaller than the outer diameter of the first C clamp and the outer diameter of the second end of the resilient device.

8. The vehicle piston pusher of claim 1, wherein the direction switchable ratchet wrench includes two stick bodies that are mutually spaced, the two stick bodies pivotally disposed at the rotation member; the direction switchable ratchet wrench includes a ratchet disposed between the two stick bodies, the ratchet provided with an outer periphery and an ratchet bore, the outer periphery peripherally provided with a plurality of teeth, the ratchet bore fixed with an outer face of the outer barrel of the rotation member.

9. The vehicle piston pusher of claim 8, wherein the direction switchable ratchet wrench includes a pawl pivotally disposed between the two stick bodies to engage the ratchet; an operation shaft is fixed between the two stick bodies and extends along a direction away from the ratchet; the operation shaft is provided with a handle.

* * * * *